(12) United States Patent
Jang

(10) Patent No.: US 10,705,844 B2
(45) Date of Patent: Jul. 7, 2020

(54) METHOD AND DEVICE FOR REGISTER MANAGEMENT

(71) Applicant: SAMSUNG ELECTRONICS CO., LTD., Suwon-si (KR)

(72) Inventor: Choonki Jang, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 15/151,195

(22) Filed: May 10, 2016

(65) Prior Publication Data

US 2017/0139707 A1 May 18, 2017

(30) Foreign Application Priority Data

Nov. 16, 2015 (KR) .................. 10-2015-0160453

(51) Int. Cl.
*G06F 9/30* (2018.01)
*G06T 1/60* (2006.01)
*G06F 9/50* (2006.01)
*G06F 9/38* (2018.01)

(52) U.S. Cl.
CPC .......... *G06F 9/3012* (2013.01); *G06F 9/3005* (2013.01); *G06F 9/3009* (2013.01); *G06F 9/30076* (2013.01); *G06F 9/30123* (2013.01); *G06F 9/3851* (2013.01); *G06F 9/5011* (2013.01); *G06T 1/60* (2013.01)

(58) Field of Classification Search
None
See application file for complete search history.

(56) References Cited

U.S. PATENT DOCUMENTS

| 4,435,753 | A  | * | 3/1984  | Rizzi ...................... G06F 8/441 |
|           |    |   |         | 717/153 |
| 6,546,478 | B1 | * | 4/2003  | Keller ................. G06F 9/30149 |
|           |    |   |         | 712/204 |
| 7,660,970 | B2 |   | 2/2010  | Kim et al. |
| 8,180,997 | B2 | * | 5/2012  | Burger .................. G06F 9/3885 |
|           |    |   |         | 712/15 |
| 2004/0088319 | A1 |  | 5/2004  | Yamazaki et al. |
| 2004/0158826 | A1 | * | 8/2004  | Bliss ....................... G06F 8/441 |
|           |    |   |         | 717/151 |
| 2009/0240895 | A1 | * | 9/2009  | Nyland ................. G06F 9/3824 |
|           |    |   |         | 711/149 |
| 2010/0199270 | A1 | * | 8/2010  | Baev ....................... G06F 8/441 |
|           |    |   |         | 717/157 |
| 2011/0161616 | A1 | * | 6/2011  | Tarjan ..................... G06F 9/384 |
|           |    |   |         | 711/170 |
| 2012/0242673 | A1 |   | 9/2012  | Udayakumaran |
| 2014/0122842 | A1 | * | 5/2014  | Abernathy ............ G06F 9/3012 |
|           |    |   |         | 712/225 |
| 2014/0325190 | A1 | * | 10/2014 | Chow ................... G06F 9/3001 |
|           |    |   |         | 712/221 |
| 2015/0113251 | A1 | * | 4/2015  | Jian ..................... G06F 9/30098 |
|           |    |   |         | 712/214 |

OTHER PUBLICATIONS

Yang, Yi, et al. "Shared Memory Multiplexing: A Novel Way To Improve GPGPU Throughput." *Proceedings of the 21st international conference on Parallel architectures and compilation techniques.* ACM, 2012. (10 pages, in English).

* cited by examiner

*Primary Examiner* — George Giroux
(74) *Attorney, Agent, or Firm* — F. Chau & Associates, LLC

(57) ABSTRACT

In a data processing method, a method and device for adjusting the number of registers used in a running thread according to a situation are disclosed.

12 Claims, 13 Drawing Sheets

METHOD AND DEVICE FOR REGISTER MANAGEMENT

CROSS-REFERENCE TO RELATED APPLICATIONS

This application claims the benefit under 35 USC 119(a) of Korean Patent Application No. 10-2015-0160453 filed on Nov. 16, 2015 in the Korean Intellectual Property Office, the entire disclosure of which is incorporated herein by reference for all purposes.

BACKGROUND

1. Field

The following description relates to a method and a device for register management.

2. Description of the Related Art

High-performance graphic cards are being widely used to generate computerized composite images. Also, with an increase in processing resources, video graphic controllers assume functions otherwise performed by central processing units (CPUs).

In particular, as the computer game industry develops, high graphics processing performance is being demanded. Also, as the standard for images used in various advertisements, movies, and so on, in addition to the computer game industry increases, high graphics processing performance is also being demanded. With regard to this shift, the name graphics processing unit (GPU) has come into use to distinguish specialized graphic processors from existing CPUs.

In a graphics processing process, steps such as rendering or shading are performed, and processing resources such as a compiler, a register, and so on are used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of processing data includes executing a first code block, including one or more execution codes, using a first number of registers allocated to the first code block, acquiring a second number, wherein the second number is a number of registers for executing a second code block, comprising one or more execution codes, executed after the first code block, and allocating a number of registers corresponding to the second code block to the second code block based on a difference between the first number and the second number, and executing the second code block using the registers allocated to the second code block.

Each of the first code block and the second code block may be included in one thread of threads managed by a warp, wherein a warp is an independent data processor.

The allocating of the number of registers corresponding to the second code block to the second code block may include updating a register occupancy table (ROT), wherein the ROT includes information related to a number of registers corresponding to each of the first code block and the second code block.

Each thread managed by the warp may include code blocks, and the ROT may include information related to a number of registers corresponding to each of the code blocks included in the threads.

Each thread managed by the warp may include code blocks, and the ROT may include information related to a maximum number of registers, which is a greatest number among numbers of registers for executing respective code blocks to be executed after a currently executed code block from among the code blocks included in the threads.

The allocating of the number of registers corresponding to the second code block to the second code block may include updating a register hash (RH), wherein the RH includes information related to information on the number of registers corresponding to the second code block.

The one or more execution codes of the first code block and the second code block may each include a set of consecutive instructions for performing one or more operations.

The consecutive instructions of at least one of the first code block and the second code block may satisfy a single-entry single-exit (SESE) condition.

The number corresponding to the second code block may be determined based on the difference and a preset minimum register unit.

The allocating of the number of registers corresponding to the second code block to the second code block may include, in response to the first number being smaller than the second number, performing an additional allocation to increase the number of registers allocated for executing the second code block, and in response to the first number being larger than the second number, performing a free operation to reduce the number of registers allocated for executing the second code block.

In one general aspect, a device for processing data includes a receiver configured to receive code blocks comprising one or more execution codes, and a controller configured to execute a first code block received from the receiver using a first number of registers allocated to the first code block, acquire a second number, wherein the second number is a number of registers for executing a second code executed after the first code block and received from the receiver, allocate a number of registers corresponding to the second code block to the second code block based on a difference between the first number and the second number, and execute the second code block using the registers allocated to the second code block.

Each of the first code block and the second code block may be included in one thread of threads managed by a warp, wherein a warp is an independent data processor.

The controller may update a register occupancy table (ROT), wherein the ROT includes information related to a number of registers corresponding to each of the first and second code blocks.

Each thread managed by the warp may include code blocks, and the ROT may include information related to a number of registers corresponding to each of the code blocks included in the threads.

Each thread managed by the warp may include code blocks, and the ROT may include information related to a maximum number of registers, which is a greatest number among numbers of registers for executing respective code blocks to be executed after a currently executed code block from among the code blocks included in the threads.

The controller may update a register hash (RH), wherein the RH includes information related to the number of registers corresponding to the second code block.

The one or more execution codes of the first code block and the second code block may each include a set of consecutive instructions for performing one or more operations.

The consecutive instructions of at least one code block may satisfy a single-entry single-exit (SESE) condition.

The controller may perform additional allocation to increase the number of registers allocated for executing the second code block in response to the first number being smaller than the second number, and may perform a free operation to reduce the number of registers allocated for executing the second code block in response to the first number being larger than the second number.

In another general aspect, a non-transitory computer-readable storage medium stores instructions for causing a processor/computer to perform the method described above.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
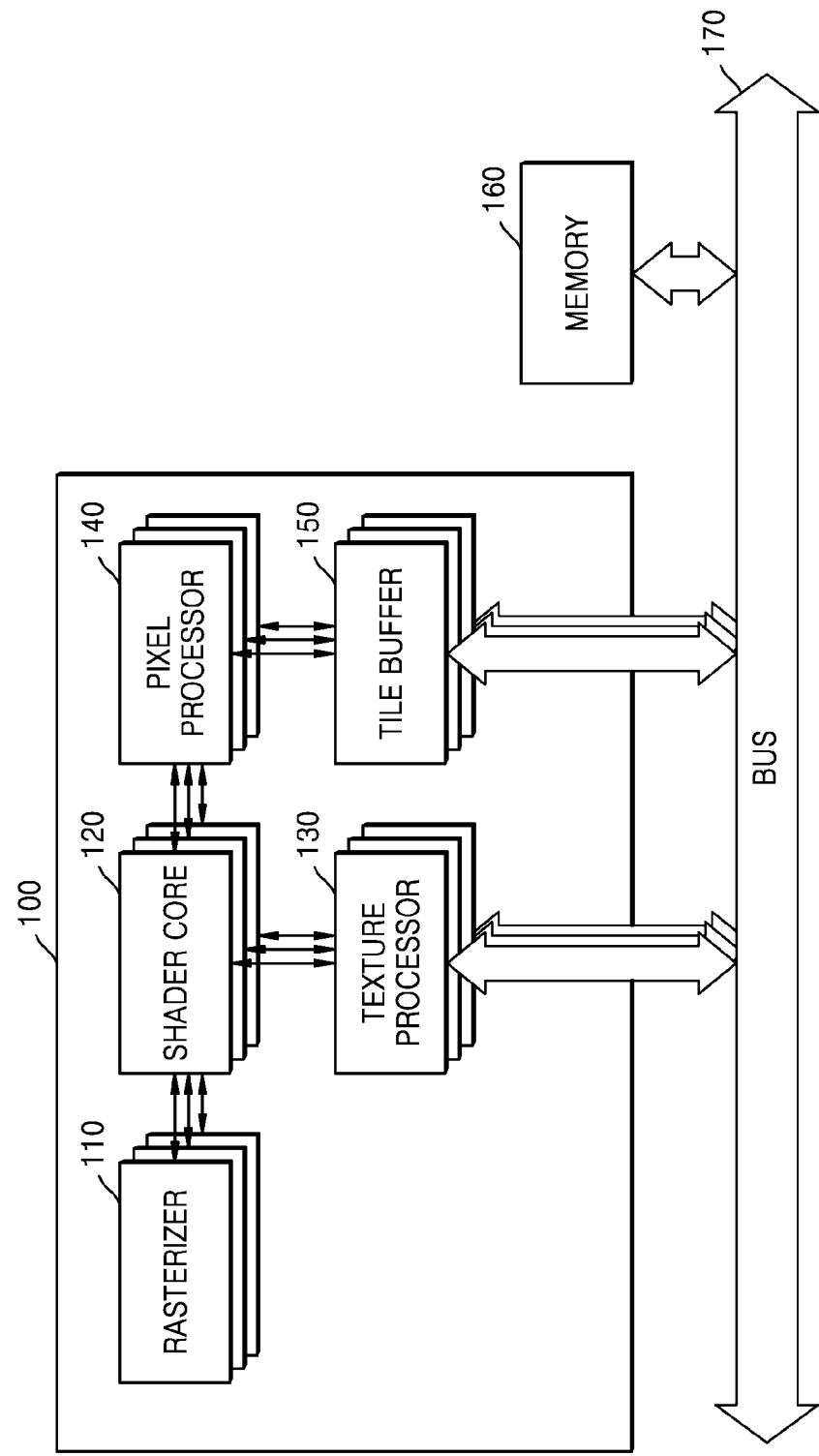
FIG. 1 is a diagram showing a graphics processing device according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Reference is now made in further detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of example embodiments. As used herein, the term "and/or" includes any and all combinations of one or more of the associated listed items.

The terms "include" or "have," as used herein are not to be interpreted as limiting or precluding the presence of additional elements, and are to be interpreted as being able to further include additional elements or operations, as appropriate.

Further, as used herein, terms including ordinal numbers, such as "first," "second," etc., are used to represent various elements, but are not intended to limit corresponding elements. Such terms are only used for distinguishing one element from another element.

Embodiments relate to a method and a device for processing data. Details of description that are widely known to those of ordinary skill in the art to which the following embodiments pertain are omitted for brevity.

Provided are a method and a device for adjusting the number of registers used in a running thread according to characteristics of a situation to more efficiently use limited hardware resources.

FIG. 1 is a diagram showing a graphics processing device 100 according to an embodiment. However, general-use components other than those shown in the example of FIG. 1 are optionally further included in the graphics processing device 100.

Referring to the embodiment of FIG. 1, a graphics processing device 100 includes rasterizers 110, shader cores 120, texture processors 130, pixel processors 140, and tile buffers 150. It is to be recognized that for each of these elements present in the graphics processing device 100 is possibly present in a single instance or multiple instances, depending the particular embodiment. Also, in the embodiment of FIG. 1, the graphics processing device 100 exchanges data with an external memory 160 through a bus 170.

The graphics processing device 100 shown in the embodiment of FIG. 1 is a device for processing three-dimensional (3D) graphics, and optionally uses tile-based rendering (TBR). In other words, for example, to generate 3D graphics corresponding to one frame, the graphics processing device 100 causes a plurality of equally sized tiles obtained by dividing the frame to pass through the rasterizers 110, the shader cores 120, and the pixel processors 140, and stores the processing results in the tile buffers 150. The graphics processing device 100 processes all the tiles constituting the frame in parallel using a plurality of channels, each composed of the rasterizers 110, the shader cores 120, and the pixel processors 140. When the tiles of the plurality of tiles corresponding to the frame are processed, the graphics processing device 100 transmits the processing results stored in the tile buffers 150 to a frame buffer of the memory 160.

For example, the rasterizers 110 rasterize primitives generated using a geometric transformation by vertex shaders.

In this example, the shader cores 120 receive the rasterized primitives from the rasterizers 110 and then perform pixel shading. For example, the shader cores 120 perform pixel shading for determining colors of all of the pixels of tiles that include fragments of the primitives generated through the rasterization. Furthermore, in such an example, to generate stereoscopic and realistic 3D graphics in the pixel shading process, the shader cores 120 use pixel values that are generated using a texture.

For example, the shader cores 120 may include pixel shaders. Also, the shader cores 120 may further include vertex shaders, or may be integrated shaders in which vertex shaders and pixel shaders are integrated together. When the shader cores 120 perform a function of acting as vertex shaders, the shader cores 120 generate primitives representing an object and transfer the primitives to the rasterizers 110.

When a shader core 120 requests pixel values corresponding to certain pixels from a texture processor 130, the texture processor 130 transfers pixel values generated by processing a texture prepared in advance. For example, the texture is stored in a certain memory space inside or outside the texture processor 130 or in the memory 160 outside the graphics processing device 100, acting as external data storage. When the texture used to generate the pixel values requested by the shader core 120 is not in the certain space in the texture processor 130, the texture processor 130 accordingly acquires the texture from a memory space outside the texture processor 130 or the memory 160.

Through a process, such as a depth test and so on, a pixel processor 140 determines pixel values to be finally displayed along with pixels corresponding to the same position in one tile, accordingly determining all pixel values corresponding to that tile.

A tile buffer 150 stores all of the pixel values transferred from the pixel processor 140 and corresponding to the current tile. When a graphics processing process for all of the tiles constituting one frame is finished, processing results stored in the tile buffers 150 are then transferred to the frame buffer of the memory 160.

Figure 2:
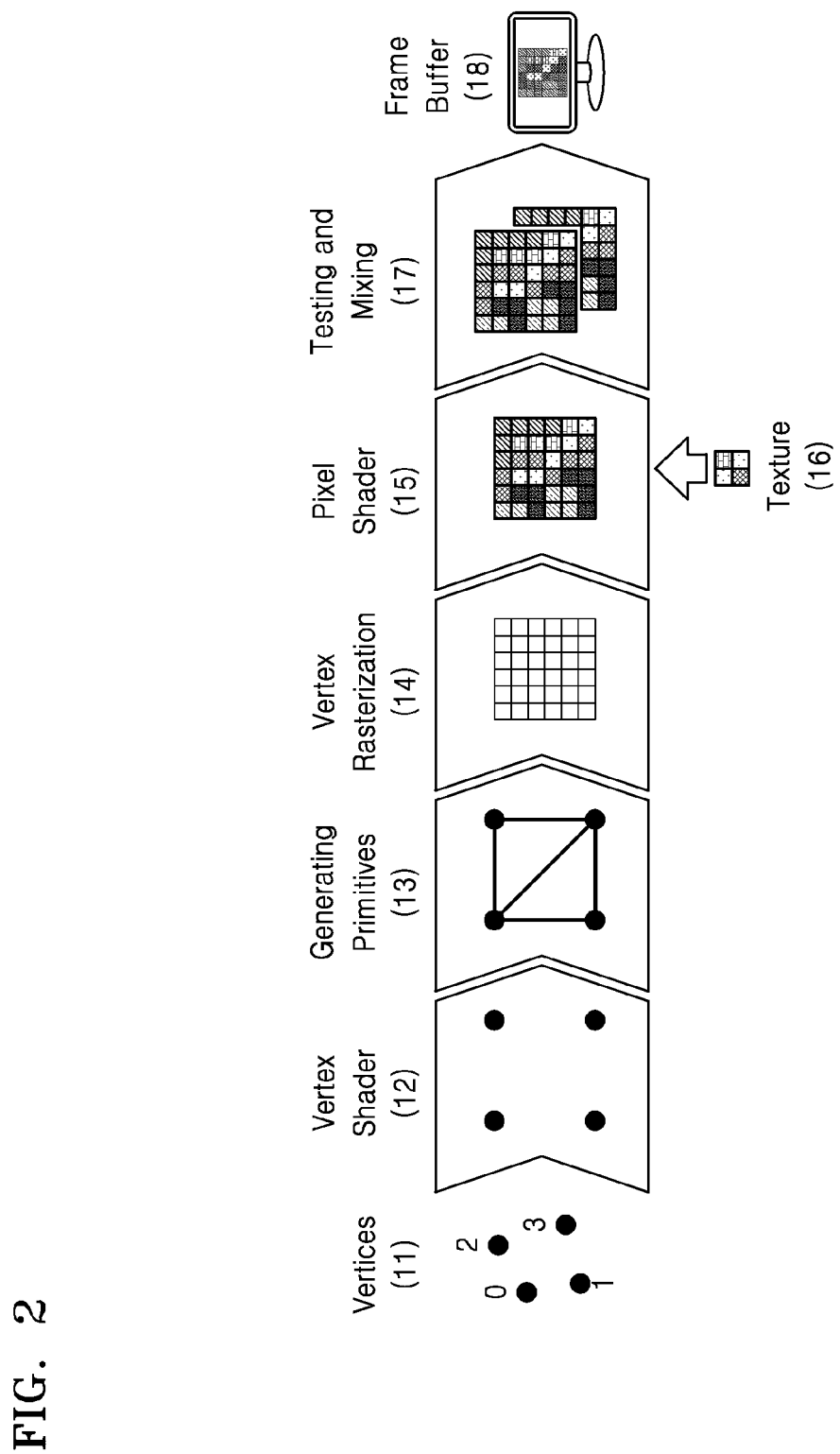
FIG. 2 is a diagram illustrating a process of processing three-dimensional (3D) graphics in the graphics processing device.

FIG. 2 is a diagram illustrating a process of processing 3D graphics in the graphics processing device 100.

The process of processing 3D graphics, as illustrated in the example of FIG. 2 is roughly divided into three operations. These three operations include geometric transformation, rasterization, and pixel shading. Subdivided aspects of these processes are described below with reference to the example of FIG. 2. Referring to the example of FIG. 2, the process of processing 3D graphics is shown as including operation 11 to operation 18.

Operation 11 is an operation in which vertices are generated. The vertices are generated to display objects included in 3D graphics.

Operation 12 is an operation in which the generated vertices are shaded. By designating positions of the vertices generated in operation 11, vertex shaders shade the vertices appropriately.

Operation 13 is an operation in which primitives are generated. A primitive represents a point, a line, a polygon, and so on, formed using at least one vertex. As an example of a primitive is a triangle formed by connecting vertices. Such primitives are combined to form a composite graphic image.

Operation 14 is a primitive rasterization operation, also referred to as vertex rasterization. Rasterization of a primitive refers to a division of the primitive into fragments. For example, such a fragment may be a basic unit for performing graphics processing on a primitive. Since primitives include only information on vertices, fragments between vertices are generated during the rasterization operation, so that graphics processing for 3D graphics is able to be performed.

Operation 15 is a pixel shading operation. For example, fragments generated during the rasterization operation and constituting the primitives are pixels constituting a tile. In a relevant field, the terms "fragment" and "pixel" are mixed and used appropriately, as occasion demands. For example, a pixel shader is also sometimes called a fragment shader. Generally, a basic unit of graphics processing constituting a primitive is called a fragment, and then a basic unit of graphics processing from pixel shading is called a pixel. While pixel shading, colors of pixels are determined.

Operation 16 is a texturing operation performed for determining colors of the pixels. Texturing is a process of determining a color of a pixel using a texture, which is an image such as a two-dimensional (2D) image prepared in advance. Because calculating and determining a color of each pixel to present various colors and patterns of objects in the real world increases the amount of data calculation used for graphics processing and accordingly leads to a greater a graphics processing time, colors of the pixels are determined using a texture that is prepared in advance to help streamline graphics processing. For example, surface colors of objects are additionally stored as 2D images referred to as textures, and the stored textures are enlarged or reduced according to a position, a size, and so on, of an object in a screen, or texel values may be mixed using textures having various resolutions, so that colors of pixels may be determined. Here, a texel, texture element, or texture pixel is the fundamental unit of texture space. Textures are represented by arrays of texels, just as pictures are represented by arrays of pixels.

In further detail, for rapid 3D graphics processing in the pixel shading process to occur successfully, it is possible to use pixel values generated using textures that are prepared in advance. Here, in order to adaptively cope with the size of an object, a plurality of textures having different resolutions are prepared in advance, and pixel values are generated by combining the textures. The textures having different resolutions and prepared in advance are referred to as mipmaps. For example, to generate pixel values of an object having an intermediate resolution of two mipmaps that are prepared in advance, texel values of positions corresponding to the object are extracted from the two mipmaps and filtered.

Operation 17 is a testing and mixing operation. Pixel values that are to be finally displayed with pixels corresponding to the same position in a tile are determined through an appropriate process, such as an appropriate depth test or another appropriate determination process, so that pixel values corresponding to the tile are determined. By mixing information related to a plurality of tiles generated through such a process, it is possible to generate 3D graphics corresponding to a frame.

Operation 18 is a process of storing the frame generated through operation 11 to operation 17 in the frame buffer, and also displaying the frame stored in the frame buffer using a display device.

Figure 3:
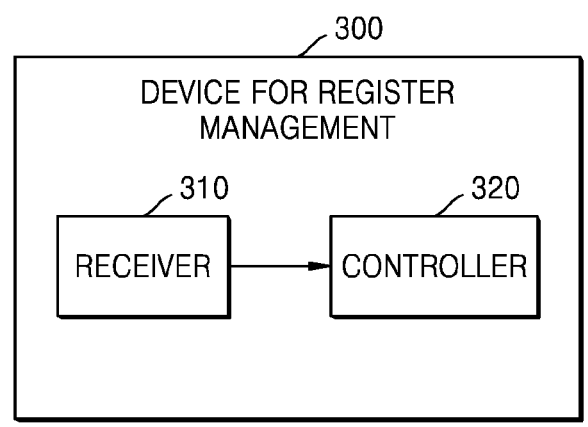
FIG. 3 is a diagram illustrating a constitution and operation of a device for register management according to an embodiment.

FIG. 3 is a diagram illustrating a constitution and an operation of a device 300 for register management according to an embodiment. The device 300 for register management according to such an embodiment dynamically manages registers. For example, a data processing device includes the device 300. Accordingly, the device 300 processes data. The operation of the device 300 is discussed further, below.

In this disclosure, a "vertex" and a "pixel" are used as basic units of graphics processing.

Also, in this specification, a "shader" according to an embodiment may implement an algorithm for aspects of graphics processing.

Referring to the example of FIG. 3, the device 300 for register management includes a receiver 310 and a controller 320. In the device 300 for register management shown in the example of FIG. 3, only components related to an embodiment are shown. Therefore, general-use components other than those shown in FIG. 3 are optionally further included, as appropriate.

For example, the receiver 310 according to an embodiment receives a plurality of threads, including one or more execution codes. In such an embodiment, a thread according to an embodiment includes a performance path present in a process or a series of execution codes when a computer program is executed. For example, when a certain thread is run, an instruction of a code block corresponding to that certain thread is executed. In another example, when a thread is run, consecutive instructions for performing one or more operations are executed. In such an example, the consecutive instructions may satisfy a condition of a single-entry single-exit (SESE) structure or a single-entry multiple-exit (SEME) structure. Also, in an embodiment, a code block according to an embodiment represents a set of consecutive instructions for performing one or more operations and/or a memory region in which the consecutive instructions are stored. As an example, a code block is a set of one or more instructions satisfying the condition of an SESE structure or an SEME structure, or a memory region in which the one or more instructions satisfying the condition of an SESE structure or an SEME structure are stored. As another example, a thread includes a code block that is a set of consecutive instructions for performing one or more operations.

The receiver 310 according to such an embodiment receives, for example, a first code block and a second code block. In such an embodiment, each of the first code block and the second code block are one of a plurality of threads included in one warp. Warps manage sets of threads belonging to the same block.

For example, the controller 320 according to an embodiment may simultaneously run a plurality of threads. Also, the controller 320 according to an embodiment may separately process a plurality of threads. For example, the controller 320 according to such an embodiment executes a plurality of code blocks as one execution unit. In an embodiment, a warp according to an embodiment uses a type of data processor. A warp according to such an embodiment includes one or more threads that the warp manages. When the controller 320 executes a plurality of threads as one execution unit according to such an embodiment, the plurality of threads bound together as the execution unit are referred to as a warp. Also, the controller 320 according to such an embodiment operates using a single instruction multiple thread (SIMT) architecture.

Such a controller 320 executes a plurality of code blocks included in one thread as one execution unit, according to an embodiment.

In a graphics processor (GPU) according to an embodiment, the number of simultaneously executable warps is determined. When a warp according to such an embodiment is executed, registers are used by the warp to manage information for the threads in that warp. For example, when a warp according to such an embodiment is executed, a register file, which is a type of set of registers, is used. In one particular example, with regard to warp execution, the controller 320 according to such an embodiment uses a register file implemented as a static random access memory (SRAM).

The controller 320 according to such an embodiment executes the first code block including one or more execution codes using a first number of registers allocated to the first code block.

A warp according to such an embodiment includes a plurality of threads. Each of the plurality of threads included in the warp according to such an embodiment has a corresponding code block. For example, the first code block and the second code block each correspond to a first thread, and a third code block and a fourth code block each correspond to a second thread.

The receiver 310 according to such an embodiment receives the first code block. Also, the controller 320 according to such an embodiment executes the first code block. For example, the controller 320 according to such an embodiment executes a plurality of execution codes corresponding to the first code block.

When the controller 320 according to such an embodiment executes the first code block, the first number of registers is used. For example, when the controller 320 according to such an embodiment executes the first code block, four registers are used for information storage during the execution.

In an embodiment, a warp includes a preset number of threads. For example, a warp according to an embodiment includes 32 threads. The number of registers for executing one or more code blocks corresponding to each of the threads included in the warp is also determined to be a maximum value or less. For example, each code block is executed using R or fewer registers. In an such an embodiment, the maximum number of registers for executing each code block included in a thread is preset or determined according to a setting, which is optionally adjustable depending on the characteristics of the warp and the memory requirements of the threads in the warp.

The controller 320 according to such an embodiment also acquires a second number, where the second number is the number of registers used for executing the second code block executed after the first code block, and allocates the number of registers corresponding to the second code block to the second code block based on a difference value between the first number and the second number. That is, allocating registers to the second code block is based on register availability in light of the registers required for executing the code block and the registers previously allocated for processing the first code block.

Each of the first code block and the second code block according to an embodiment are included in one of the plurality of threads included in the warp, which is an independent data processor designated for processing the threads.

When executing the warp, the controller 320 according to an embodiment consecutively executes the first code block and the second code block included in the first thread from among the plurality of threads included in the warp. When the second code block is executed after the first code block is executed, the controller 320 according to such an embodiment acquires the second number, which is the number of registers used for executing the second code block. For example, while executing the first code block, the controller 320 according to such an embodiment acquires the number of registers allocated to the second code block that is a code block to be executed after the first code block.

Thus, the controller 320 according to such an embodiment acquires the second number, and allocates the number of registers corresponding to the second code block for execution of the second code block based on the difference value between the first number, which is the number of registers used to execute the first code block, and the acquired second number.

For example, when the number of registers for executing the first code block is four and the number of registers for executing the second code block is seven, the controller 320 according to such an embodiment allocates the difference between seven, which is the number of registers corresponding to the second code block, and four, which is 3. For example, after executing the first code block, the controller 320 additionally allocates three registers for execution of the second code block because four registers were previously allocated and three more registers are required for the total of seven registers to have been allocated.

The controller 320 according to another embodiment acquires the second number of regions, and allocates the number of registers corresponding to the second code block for execution of the second code block based on the difference between the first number, which is the number of registers used to execute the first code block, and the acquired second number and a preset minimum register allocation unit. Here, such a preset minimum register allocation unit refers to a smallest chunk of additional registers that can be allocated.

For example, when the number of registers for executing the first code block is four, the number of registers for executing the second code block is seven, and the preset minimum register allocation unit is two, the controller 320 according to the other embodiment allocates eight registers, which is the number of registers corresponding to the second code block based on the difference value between seven and four, which is 3, and the minimum register allocation unit of two, registers for execution of the second code block. In this example, the controller 320 according to the other embodiment may additionally allocate or free registers only in units of two, which is the minimum register allocation unit, and thus allocates eight registers when seven registers are necessary, because allocating seven registers would not allocate a complete unit of two registers.

The controller 320 according to an embodiment executes the second code block using the registers allocated to the second code block.

For example, the controller 320 according to such an embodiment executes the second code block using the number of registers corresponding to the second code block or allocated to the second code block. As part of executing the second code block, the controller 320 according to such an embodiment executes a series of instructions included in the second code block.

The controller 320 according to such an embodiment updates a register occupancy table (ROT) that includes information including information on the number of registers corresponding to each of the first code block and the second code block.

For example, the ROT according to an embodiment includes information on addresses of registers corresponding to each thread or each code block in a memory. Alternatively, the ROT according to an embodiment includes information on addresses of registers corresponding to a plurality of threads or a plurality of code blocks included in one or more warps in a memory. For example, the ROT includes physical address information of registers used to execute the first code block and physical address information of registers used to execute the second code block. According to an embodiment, addresses of registers used for execution of each thread or each code block are addresses in the SRAM. However, addresses of registers may be addresses in other types of memory, where the memory is not an SRAM memory.

For example, the ROT according to an embodiment is implemented using appropriate hardware. For example, the ROT is implemented as an object implemented using appropriate hardware that manages registers used to execute a plurality of warps.

Also, in an embodiment, the ROT includes information on the number of registers corresponding to each code block included in the threads. For example, the ROT includes information indicating that the number of registers corresponding to the first code block is four and the number of registers corresponding to the second code block is seven. These numbers are discussed further in greater detail, above.

Also, in an embodiment, the ROT includes information indicating a maximum number of registers, which is the maximum number among numbers of registers for executing respective code blocks executed after a currently executed code block among code blocks included in the threads. For example, there may be an example in which three code blocks including the first code block, the second code block, and a third code block are included in a thread and executed in order of the first code block, the second code block, and the third code block, and four, seven, and five registers are necessary to execute the first, second, and third code blocks respectively. In such an example, the maximum number of registers is seven when the first code block is executed, and is five when the second code block is executed. In an example, information on each maximum number of registers is included in the ROT.

The controller 320 according to such an embodiment updates the ROT according to an allocation of a certain number of registers to a certain code block included in a thread.

As an example, the controller 320 according to such an embodiment updates the ROT according to an allocation of the number of registers corresponding to the second code block to the second code block. For example, according to the allocation of the number of registers corresponding to the second code block to the second code block, the controller 320 according to such an embodiment updates information on addresses allocated to the second code block in the ROT. As another example, the controller 320 according to such an embodiment updates information on addresses of registers allocated to the first code block and the registers allocated to the second code block in the ROT according to the allocation of the number of registers corresponding to the second code block being allocated to the second code block.

The controller 320 according to such an embodiment updates a register hash (RH) that is information including information on the number of registers corresponding to the second code block.

For example, the RH according to an embodiment includes information on addresses of registers corresponding to a certain thread in a memory. As an example, a first RH includes the physical address information of the registers used to execute the first code block. As another example, a second RH includes the physical address information of the registers used to execute the second code block. According to an embodiment, addresses of registers used to run each thread are addresses in the SRAM, but other embodiments are not limited thereto.

According to an allocation of a certain number of registers to a certain thread included in a warp, the controller 320 according to such an embodiment updates the RH.

As an example, the controller 320 according to such an embodiment updates the RH according to the allocation of the number of registers corresponding to the second code block being allocated to the second code block. For example, according to the allocation of the number of registers corresponding to the second code block being allocated to the second code block, the controller 320 according to such an embodiment updates information related to addresses allocated to the second code block in the RH. As another example, the controller 320 according to such an embodiment updates information on addresses allocated to the first code block in the RH according to the allocation of the number of registers corresponding to the second code block being allocated to the second code block. Also, the RH corresponding to the first code block and the RH corresponding to the second code block possibly differ from each other, in that these data structures are possibly combined or separate from one another.

When the first number associated with the first code block is smaller than the second number associated with the second code block, the controller 320 according to such an embodiment performs an additional allocation to increase the number of registers allocated, for successful execution of the second code block.

For example, when the first number is four and the second number is seven, the first number is smaller than the second number. In this example, while four registers are required to execute the first code block, seven registers are required to execute the second code block. Therefore, to execute the second code block, the controller 320 according to such an embodiment performs an operation of allocating seven registers to the second code block by adding three additional registers to the four registers for executing the first code block, and as a result a total of the seven required registers are then available. Thus, in this example, the controller 320 according to such an embodiment performs an operation of additionally allocating three registers.

When the first number is larger than the second number, the controller 320 according to such an embodiment performs a free operation to reduce the number of registers allocated for executing the second code block. Because such an example indicates that not all of the presently allocated registers are no longer required for successful execution, freeing extra registers is helpful for optimal use of processing resources.

For example, when the first number is four and the second number is three, the first number is larger than the second number in this example. In this example, while four registers are necessary to execute the first code block, only three registers are necessary to execute the second code block. Therefore, to execute the second code block, the controller 320 according to such an embodiment performs an operation of allocating three registers to the second code block by freeing one of the four registers for executing the first code block. In this case, the controller 320 according to such an embodiment may perform an operation of freeing one register. Subsequently, the freed register is available for other uses, but execution of the second code block is not impeded.

Figure 4:
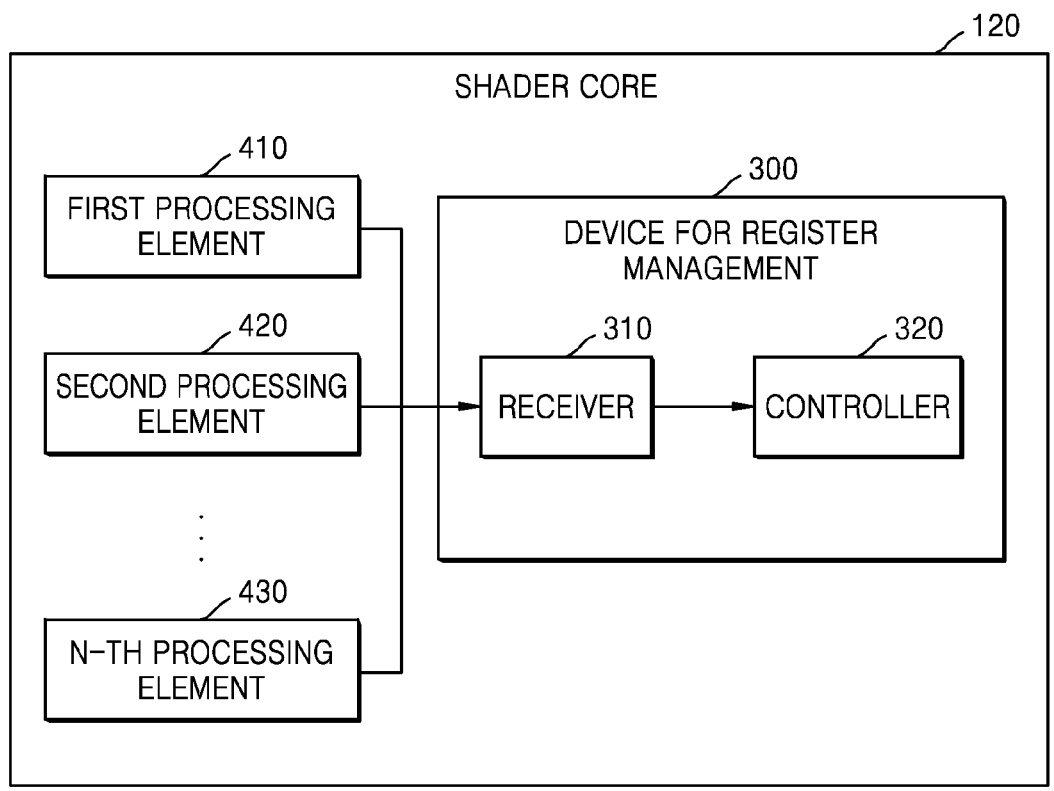
FIG. 4 is a diagram illustrating a method in which the device for register management according to an embodiment receives data from a plurality of processing elements and processes the data.

FIG. 4 is a diagram illustrating a method in which the device 300 for register management according to an embodiment receives data from a plurality of processing elements and then processes the data.

For example, the device 300 for register management according to an embodiment is positioned in a shader core 120. A shader according to an embodiment uses registers during a process of the shader performing shading. However, the number of registers used for the shader to perform shading varies as occasion demands. As the number of registers for performing shading changes, the device 300 for register management dynamically adjusts the number of registers used in the shading by requesting allocation of additional registers by requesting freeing of unnecessary registers.

Therefore, the device 300 for register management provides instructions for allocation and freeing of registers. According to allocation and freeing instructions of the device 300 for register management, a compiler generates register allocation and freeing instructions when registers are allocated and/or freed.

According to allocation and freeing instructions in accordance with an embodiment, a GPU architecture operates. For example, when a register allocation instruction for a warp is received, the GPU architecture determines whether or not there are as many registers available as are required. When there are as many registers as are required, the GPU architecture allocates the corresponding number of registers to the warp. When there are not as many registers as are required, the GPU architecture stops executing the warp until there are sufficient registers available for the warp to successfully execute.

For example, the shader core according to an embodiment includes a plurality of processing elements 410, 420, and 430. For example, there may be N processing elements, which are depicted in FIG. 4 as first processing element 410, second processing element 420, and $N^{th}$ processing element 430. Each of the plurality of processing elements 410, 420, and 430 according to an embodiment runs a thread corresponding thereto. In this example, threads are run in the processing elements 410, 420, and 430, and an RH or an ROT that is changed as the threads are run is updated in the device 300 for register management.

The processing elements 410, 420, and 430 according to another embodiment are included in the controller 320 and run threads or code blocks corresponding to the threads. In this example, when the controller 320 receives threads from the receiver 310, the processing elements 410, 420, and 430, as components of the controller 320, perform an operation of running the received threads using registers. In embodiments, a register file used to run the threads is positioned inside or outside the controller 320. Also, the register file used to run the threads is positioned inside or outside the device 300 for register management.

Figure 5:
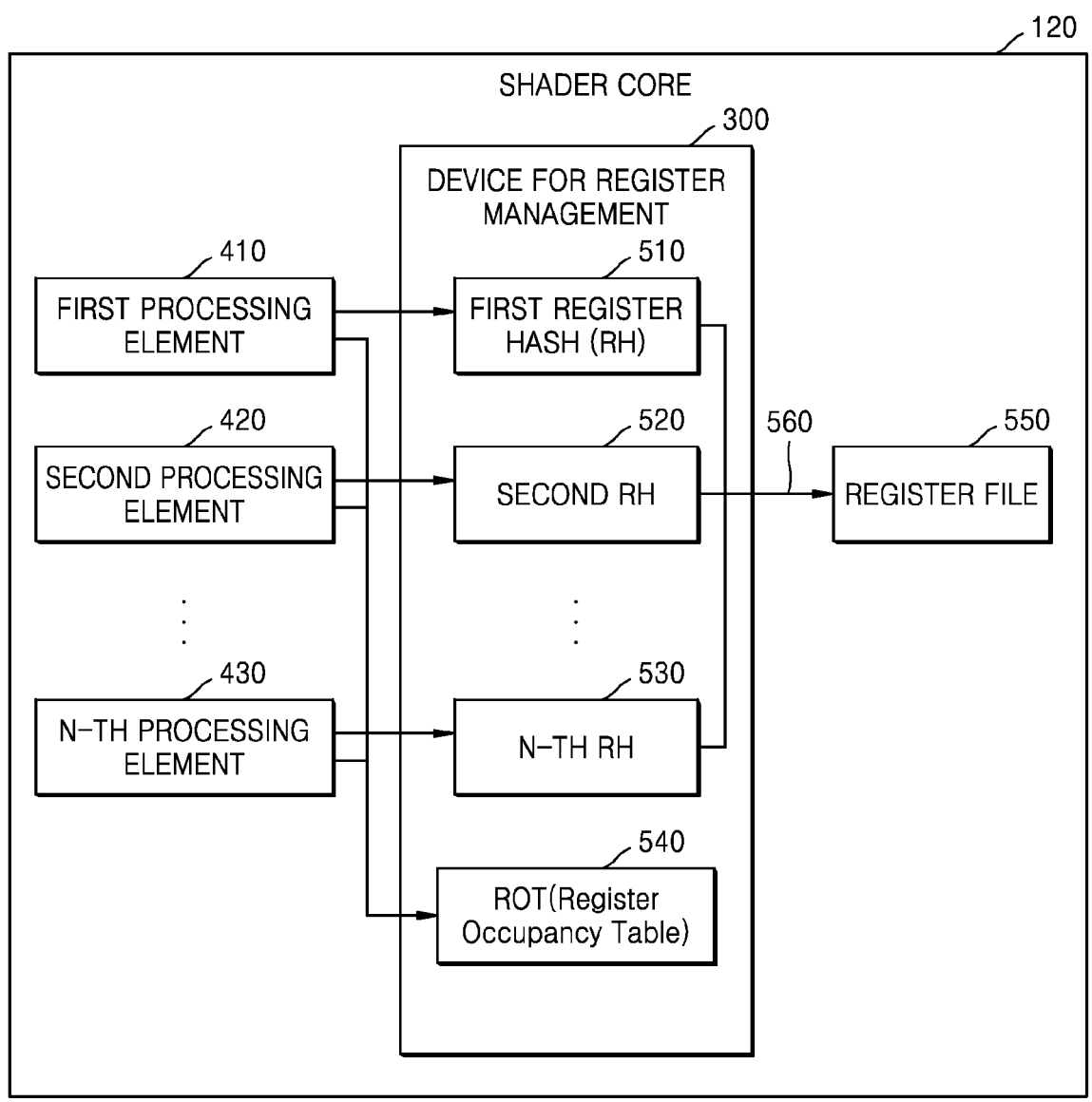
FIG. 5 is a diagram illustrating a method in which the device for register management according to an embodiment processes data using a register hash (RH) or a register occupancy table (ROT).

FIG. 5 is a diagram illustrating a method in which the device 300 for register management according to such an embodiment processes data using an RH or an ROT.

Referring to FIG. 5, the device 300 for register management includes RHs 510, 520, and 530 and an ROT 540. For example, there may be N RHs, which are depicted in FIG. 5 as first register rash (RH) 510, second RH 520, and $N^{th}$ RH 530. In the device 300 for register management shown in FIG. 5, only components related to the present embodiment are shown. Therefore, it will be appreciated that general-use components other than those shown in FIG. 5 are further included, as appropriate in other embodiments.

For example, the device 300 for register management is connected to processing elements 410, 420, and 430 and a register file 550. The processing elements 410, 420, and 430 perform calculation in certain units. For example, the first processing element 410, the second processing element 420, and the $N^{th}$ processing element 430 execute the first code block, the second code block, and an $N^{th}$ code block, respectively.

In an embodiment, an RH according to such an embodiment includes information on addresses of registers corresponding to a certain code block in a memory. As an example, the first RH 510 includes physical address information of registers used to execute a first thread or the first code block. As another example, the second RH 520 includes physical address information of registers used to execute a second thread or the second code block. According to an embodiment, addresses of registers used to execute each thread are addresses in the SRAM, but are not limited thereto, as discussed further above, in that other embodiments use other memory addressing information.

According to an allocation of a certain number of registers being allocated to a certain thread included in a warp, the device 300 for register management according to such an embodiment updates an RH.

To execute an instruction, the plurality of processing elements 410, 420, and 430 according to an embodiment transmit read or write requests to the register file 550, and the register file 550 in turn transmits processing results of the requests to the processing elements 410, 420, and 430.

According to an embodiment, the device 300 for register management is interposed between the processing elements 410, 420, and 430 and the register file 550. According to such an embodiment, the device 300 for register management includes the RHs 510, 520, and 530, and the ROT 540. The ROT 540 according to an embodiment processes a register allocation or register freeing request of each warp while storing information on registers occupied by the warp. It is to be noted that registers allocated by the ROT 540 are not consecutive for one warp. The device 300 for register management according to an embodiment includes an RH corresponding to each processing element. The RHs 510, 520, and 530 according to an embodiment convert numbers of registers requested by each warp into actually allocated register addresses.

Figure 6:
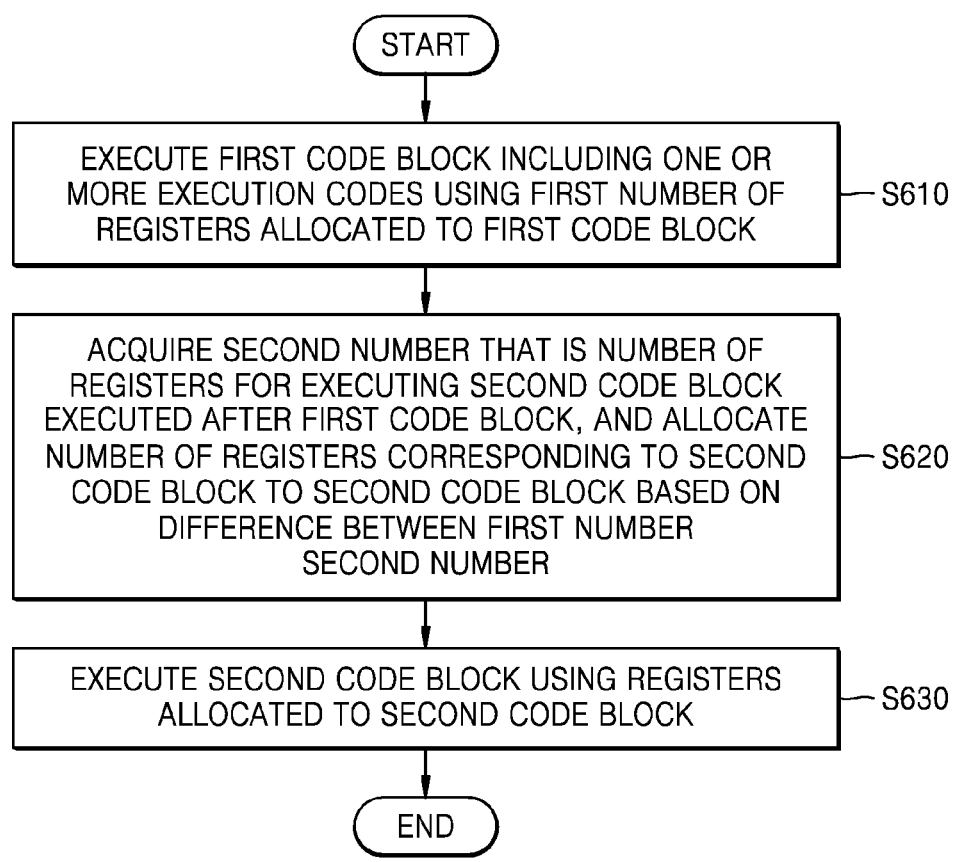
FIG. 6 is a flowchart illustrating a method in which the device for register management according to an embodiment executes a first code block and a second code block.

FIG. 6 is a flowchart illustrating a method in which the device 300 for register management according to an embodiment executes the first code block and the second code block.

A code block, according to an embodiment, represents a set of consecutive instructions for performing one or more operations and/or a memory region in which the consecutive instructions are stored. For example, a code block is a set of one or more instructions satisfying the condition of an SESE structure or an SEME structure, or a memory region in which the one or more instructions satisfying the condition of an SESE structure or an SEME structure are stored.

In an example, a thread according to such an embodiment includes a performance path that is present in a process or a series of execution codes when a computer program is executed. For example, when a certain thread is run, an instruction of a code block corresponding to the certain thread is executed. In another example, when a thread is run, consecutive instructions for performing one or more operations are executed. Here, the consecutive instructions may satisfy a condition of an SESE structure or an SEME structure.

The device 300 for register management according to such an embodiment simultaneously runs a plurality of threads. For example, the device 300 for register management according to such an embodiment separately processes a plurality of threads. The device 300 for register management according to such an embodiment executes a plurality of code blocks as one execution unit. When the device 300 for register management executes a plurality of threads as one execution unit according to an embodiment, the plurality of threads bound as the execution unit are referred to as a warp. Also, the device 300 for register management according to such an embodiment possibly operates using an SIMT architecture.

In a GPU according to such an embodiment, the number of simultaneously executable warps is determined. When a warp according to such an embodiment is executed, registers are used for that warp. For example, when a warp according to such an embodiment is executed, a register file, which is a type of set of registers, is used for that warp. For example, with respect to warp execution, the device 300 for register management according to such an embodiment may use a register file implemented in an SRAM. However, a register file implemented in this way is only an example and other implementations are possible.

In operation S610, the method executes the first code block including one or more execution codes using a first number of registers allocated to the first code block. For example, the device 300 for register management according to such an embodiment executes the first code block including one or more execution codes using a first number of registers allocated to the first code block.

As previously noted, a warp according to such an embodiment includes a plurality of threads. Each of the plurality of threads included in the warp according to such an embodiment has the one or more corresponding code blocks. For example, the first code block and the second code block correspond to a first thread, and a third code block and a fourth code block correspond to a second thread.

The device 300 for register management according to such an embodiment receives the first code block. Also, the device 300 for register management according to such an embodiment executes the first code block. For example, the device 300 for register management according to such an embodiment executes a plurality of execution codes that correspond to the first code block.

When the device 300 for register management according to such an embodiment executes the first code block, the first number of registers is used. For example, when the device 300 for register management according to such an embodiment executes the first code block, four registers are used.

A warp according to such an embodiment includes a preset number of threads. For example, a warp according to such an embodiment includes 32 threads. The number of registers for executing one or more code blocks corresponding to each of the threads included in the warp is determined to be a maximum value or less. For example, each code block may be executed using R or less registers, where R is the maximum number of registers. In an embodiment, the maximum number of registers for executing each code block included in a thread is preset or determined according to a setting, such that the maximum number of registers is adjustable based on a given computing scenario.

In operation S620, method acquires a second number, which is the number of registers for executing the second code block executed after the first code block, and allocates the number of registers corresponding to the second code block to the second code block based on the difference value between the first number and the second number. For example, the device 300 for register management according to such an embodiment acquires a second number, which is the number of registers for executing the second code block executed after the first code block, and allocates the number of registers corresponding to the second code block to the second code block based on the difference value between the first number and the second number.

Each of the first code block and the second code block according to an embodiment is included in one of the plurality of threads included in the warp, where the warp is managed using an independent data processor.

When executing the warp, the device 300 for register management according to an embodiment consecutively executes the first code block and the second code block included in the first thread among the plurality of threads included in the warp. When the second code block is executed after the first code block, the device 300 for register management according to such an embodiment acquires the second number, which is the number of registers used for executing the second code block. For example, while executing the first code block, the device 300 for register management according to such an embodiment acquires the number of registers allocated to the second code block, which is a code block to be executed after the first code block.

The device 300 for register management according to such an embodiment acquires the second number, and allocates the number of registers corresponding to the second code block for execution of the second code block based on the value of the difference between the first number, which is the number of registers used to execute the first code block, and the acquired second number.

For example, when the number of registers for executing the first code block is four and the number of registers for executing the second code block is seven, the device 300 for register management according to such an embodiment allocates seven total registers. Seven is the number of registers corresponding to the second code block, and hence the number of additional registers for execution of the second code block is based on the difference value between seven and four, which is three. For example, after executing the first code block, the device 300 for register management additionally allocates three registers for execution of the second code block to bring the total number of registers from four to seven.

The device 300 for register management, according to another embodiment, acquires the second number, and allocates the number of registers corresponding to the second code block for execution of the second code block based on the difference value between the first number, which is the number of registers used to execute the first code block, and the acquired second number, taking into account a preset minimum register allocation unit.

For example, when the number of registers for executing the first code block is four, the number of registers for executing the second code block is seven, and the preset minimum register allocation unit is two, the device 300 for register management according to the other embodiment may allocate a total of eight registers. Eight registers is the number of registers corresponding to the second code block based on the difference value between seven and four, which is three, and the minimum register allocation unit of two, registers for execution of the second code block. The device 300 for register management according to this embodiment additionally allocates or frees registers only in units of two, which is the minimum register allocation unit, and thus may allocate eight registers when seven registers are necessary, as this is the minimum number of registers to be seven or greater when allocating in units of two registers.

In operation S630, the method executes the second code block using the registers allocated to the second code block. For example, the device 300 for register management according to such an embodiment executes the second code block using the registers allocated to the second code block.

The device 300 for register management according to such an embodiment executes the second code block using the number of registers allocated to the second code block in operation S620 and corresponding to the second code block. According to the execution of the second code block, the device 300 for register management according to such an embodiment executes a series of instructions included in the second code block.

Figure 7:
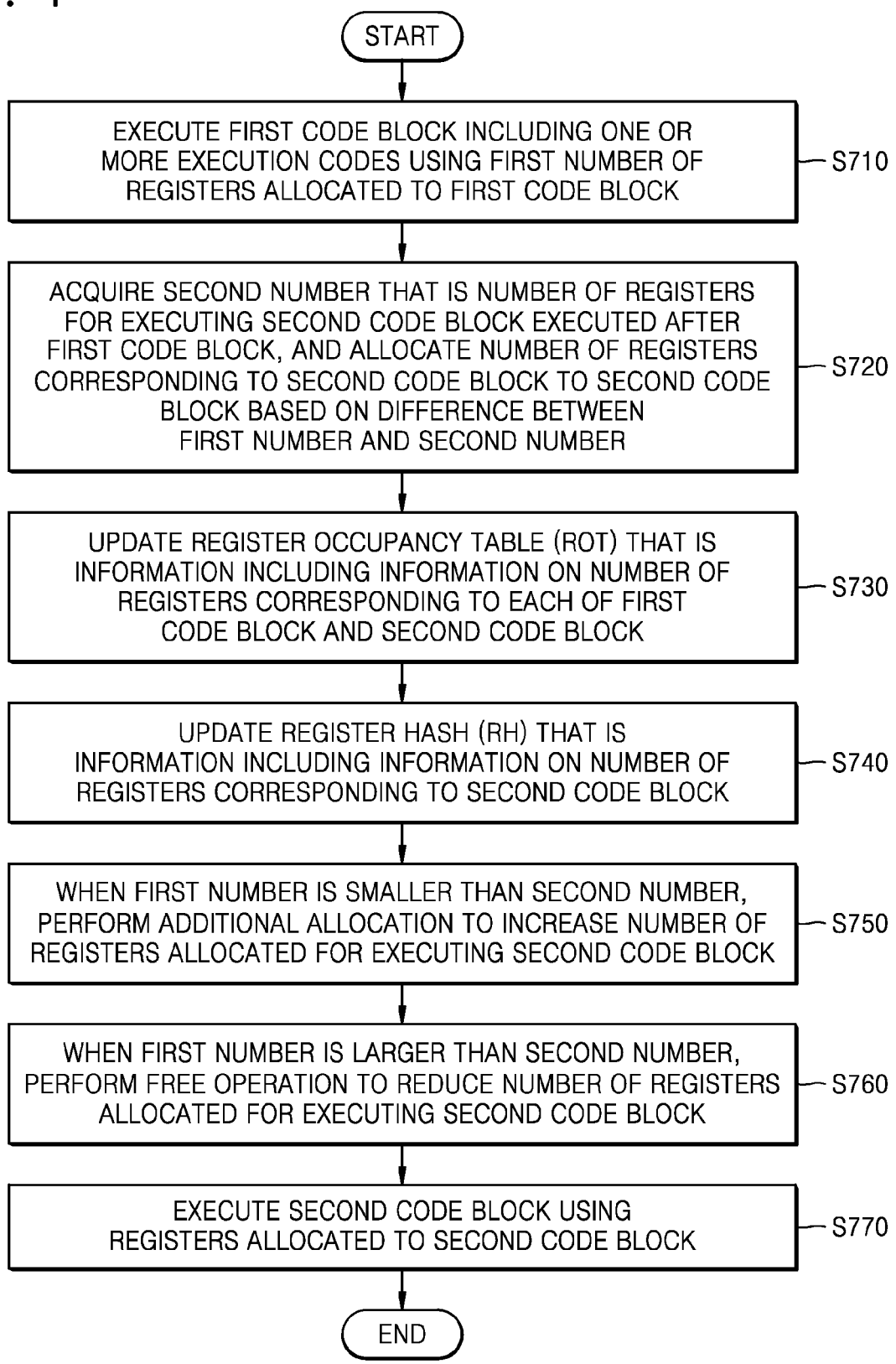
FIG. 7 is a flowchart illustrating a method in which the device for register management according to an embodiment processes data using an RH or an ROT.

FIG. 7 is a flowchart illustrating a method in which the device 300 for register management according to an embodiment processes data using an RH or an ROT.

Operations S710, S720, and S770 correspond to operations S610, S620, and S630, respectively, and thus detailed descriptions thereof are omitted to simplify the overall description.

In operation S730, the method updates an ROT, which is information including information on the number of registers corresponding to each of the first code block and the second code block. For example, the device 300 for register management updates an ROT, which is information including information on the number of registers corresponding to each of the first code block and the second code block.

For example, the ROT according to such an embodiment includes information on addresses of registers corresponding to each thread or each code block in a memory. Alternatively, the ROT according to such an embodiment includes information on addresses of registers corresponding to a plurality of threads or a plurality of code blocks included in one or more warps in a memory. For example, the ROT includes physical address information of registers used to execute the first code block and physical address information of registers used to execute the second code block. According to an embodiment, addresses of registers used for execution of each thread or each code block are addresses in the SRAM.

For example, the ROT according to an embodiment is implemented using hardware. For example, the ROT is an object implemented using hardware that manages registers used to execute a plurality of warps.

For example, the ROT includes information on the number of registers corresponding to each code block included in threads. For example, the ROT includes information indicating that the number of registers corresponding to the first code block is four and the number of registers corresponding to the second code block is seven.

For example, the ROT includes information indicating a maximum number of registers that is the largest number among numbers of registers for executing respective code blocks executed after a currently executed code block among code blocks. For example, three code blocks including the first code block, the second code block, and a third code block are included in a thread and executed in order of the first code block, the second code block, and the third code block, and four, seven, and five registers are necessary to execute the first, second, and third code blocks respectively. In such an example, the maximum number of registers is seven upon execution of the first code block and five upon execution of the second code block. In such an example, information on each maximum number of registers is included in the ROT.

The device 300 for register management according to such an embodiment updates the ROT according to an allocation of a certain number of registers being allocated to a certain code block included in a thread.

As an example, the device 300 for register management according to such an embodiment updates the ROT according to an allocation of the number of registers corresponding to the second code block being allocated to the second code block. For example, according to the allocation of the number of registers corresponding to the second code block being allocated to the second code block, the device 300 for register management according to such an embodiment updates information on addresses allocated to the second code block in the ROT. As another example, the device 300 for register management according to such an embodiment updates information on addresses of registers allocated to the first code block and the second code block in the ROT according to the allocation of the number of registers corresponding to the second code block being allocated to the second code block.

In operation S740, the updates an RH that is information including information on the number of registers corresponding to the second code block. For example the device 300 for register management according to such an embodiment updates an RH that is information including information on the number of registers corresponding to the second code block.

For example, an RH according to such an embodiment includes information on addresses of registers corresponding to a certain thread in a memory. As an example, a first RH includes the physical address information of the registers used to execute the first code block. As another example, a second RH includes the physical address information of the registers used to execute the second code block. According to such an embodiment, addresses of registers used to run each thread may be addresses in the SRAM, but are not limited thereto and alternative memory address information is used in other embodiments.

According to an allocation of a certain number of registers to a certain thread included in a warp, the device 300 for register management according to such an embodiment updates the RH.

As an example, the device 300 for register management according to such an embodiment updates the RH according to the allocation of the number of registers corresponding to the second code block being allocated to the second code block. For example, according to the allocation of the number of registers corresponding to the second code block being allocated to the second code block, the device 300 for register management according to such an embodiment updates information on addresses allocated to the second code block in the RH. As another example, the device 300 for register management, according to such an embodiment, updates information on addresses allocated to the first code block in RH according to the allocation of the number of registers corresponding to the second code block being allocated to the second code block. The RH corresponding to the first code block and the RH corresponding to the second code block may be stored together or may be stored separately.

In operation S750, when the first number is smaller than the second number, the method performs additional allocation to increase the number of registers allocated for execution of the second code block. For example, the device 300 for register management according to such an embodiment performs additional allocation to increase the number of registers allocated for execution of the second code block.

For example, when the first number is four and the second number is seven, the first number is smaller than the second number. In this case, while four registers are required to execute the first code block, seven registers are required to execute the second code block. Therefore, to execute the second code block successfully, the device 300 for register management according to such an embodiment performs an operation of allocating seven registers to the second code block by adding three registers to the four registers for executing the first code block. In this example, the device 300 for register management according to such an embodiment performs an operation of additionally allocating three registers.

In operation S760, when the first number is larger than the second number, the method performs a free operation to reduce the number of registers allocated for executing the second code block. For example, the device 300 for register management according to such an embodiment performs a freeing operation to reduce the number of registers allocated for executing the second code block, to avoid occupying an excessive number of registers.

For example, when the first number is four and the second number is three, the first number is larger than the second number. In this example, while four registers are required to execute the first code block successfully, only three registers are required to successfully execute the second code block. Therefore, to execute the second code block, the device 300 for register management according to such an embodiment performs an operation of allocating three registers to the second code block by freeing one of the four registers previously allocated for executing the first code block. In this example, the device 300 for register management according to such an embodiment performs an operation of freeing one register.

Figure 8:
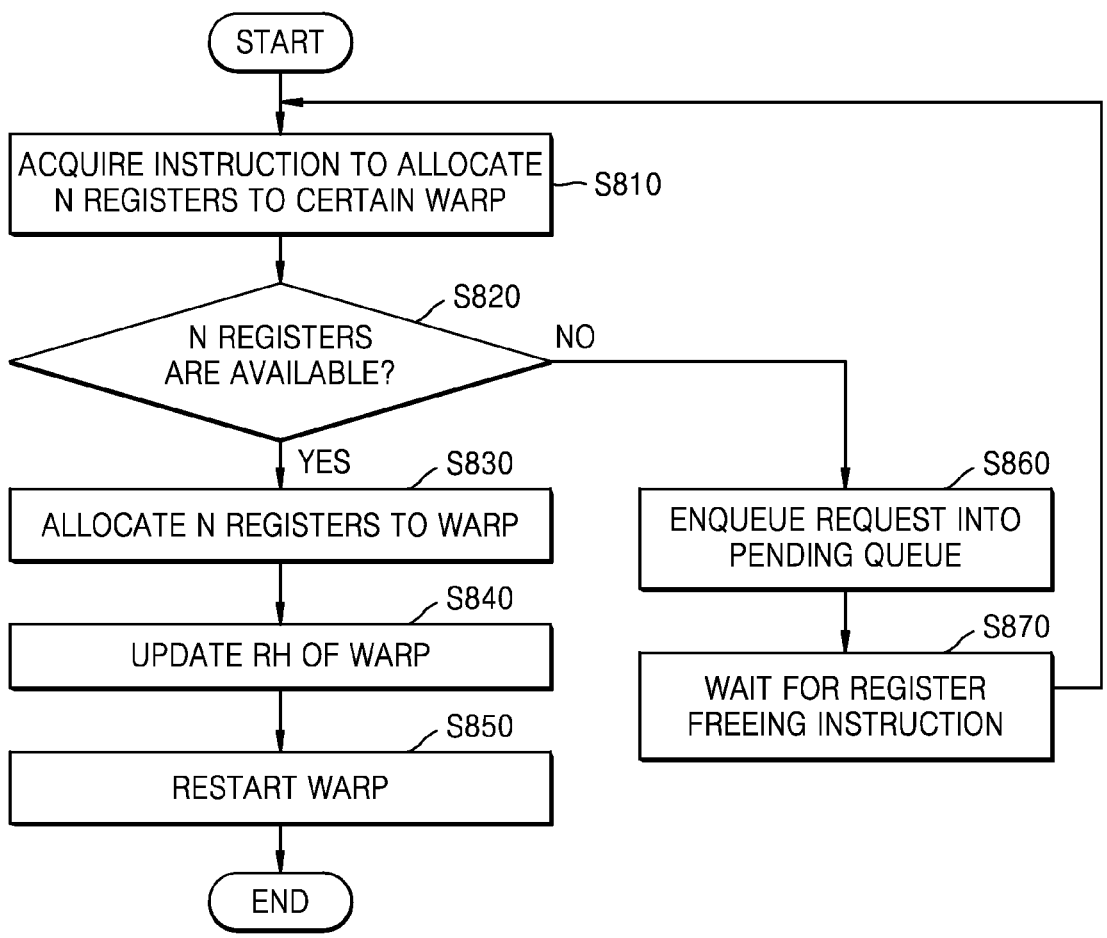
FIG. 8 is a flowchart illustrating a method in which the device for register management according to an embodiment processes data in connection with a register allocation instruction.

FIG. 8 is a flowchart illustrating a method in which the device 300 for register management according to an embodiment processes data in connection with a register allocation instruction.

In operation S810, the method acquires an instruction to allocate N registers to a certain warp. For example, the device 300 for register management according to such an embodiment acquires an instruction to allocate N registers to a certain warp.

For example, the device 300 for register management according to such an embodiment acquires an instruction to allocate seven registers to a second warp among a plurality of warps managed by the device 300 for register management.

In operation S820, the method determines whether or not the N registers are available. For example, the device 300 for register management according to such an embodiment determines whether or not the N registers are available.

For example, the device 300 for register management, according to such an embodiment, determines whether or not the N registers are available based on the number of idle registers.

In operation S830, the method allocates N registers to the warp. For example, the device 300 for register management according to such an embodiment allocates N registers to the warp.

For example, the device 300 for register management according to such an embodiment allocates N registers to the certain warp from among the plurality of warps managed by the device 300 for register management. For example, the device 300 for register management according to such an embodiment allocates seven registers to the second warp from among the plurality of warps managed by the device 300 for register management. In this example seven registers are allocated to each of a plurality of threads included in the second warp. Alternatively, in this example, seven registers are allocated to a certain thread from among the plurality of threads included in the second warp.

In operation S840, the method updates an RH of the warp. For example, device 300 for register management according to such an embodiment updates an RH of the warp.

When N registers are allocated to the warp determined in operation S810, the device 300 for register management according to such an embodiment updates an RH that includes information on data usage status resulting from the register allocation. The device 300 for register management according to such an embodiment provides register usage status that is changed by the register allocation performed in operation S830 to the RH.

When N registers are allocated to the warp determined in operation S810, the device 300 for register management according to such an embodiment updates an ROT including information on data usage status resulting from the register allocation. The device 300 for register management according to such an embodiment provides register usage status that is changed by the register allocation performed in operation S830 to the ROT.

In operation S850, the method restarts the warp. For example, the device 300 for register management according to such an embodiment restarts the warp.

The device 300 for register management according to such an embodiment restarts the warp using the registers allocated in operation S830.

In operation S860, the method enqueues a request into a pending queue. For example, the device 300 for register management according to such an embodiment enqueues a request into a pending queue.

Since, in this example, there is a lack of available registers, the device 300 for register management according to such an embodiment does not allocate N registers to the warp immediately but instead enqueues a request into the pending queue to allocate N registers later.

In operation S870, the method waits for a register freeing instruction. For example, the device 300 for register management according to such an embodiment waits for a register freeing instruction.

For example, the device 300 for register management according to such an embodiment waits until there are available registers due to register freeing performed in other warps, and so on.

Figure 9:
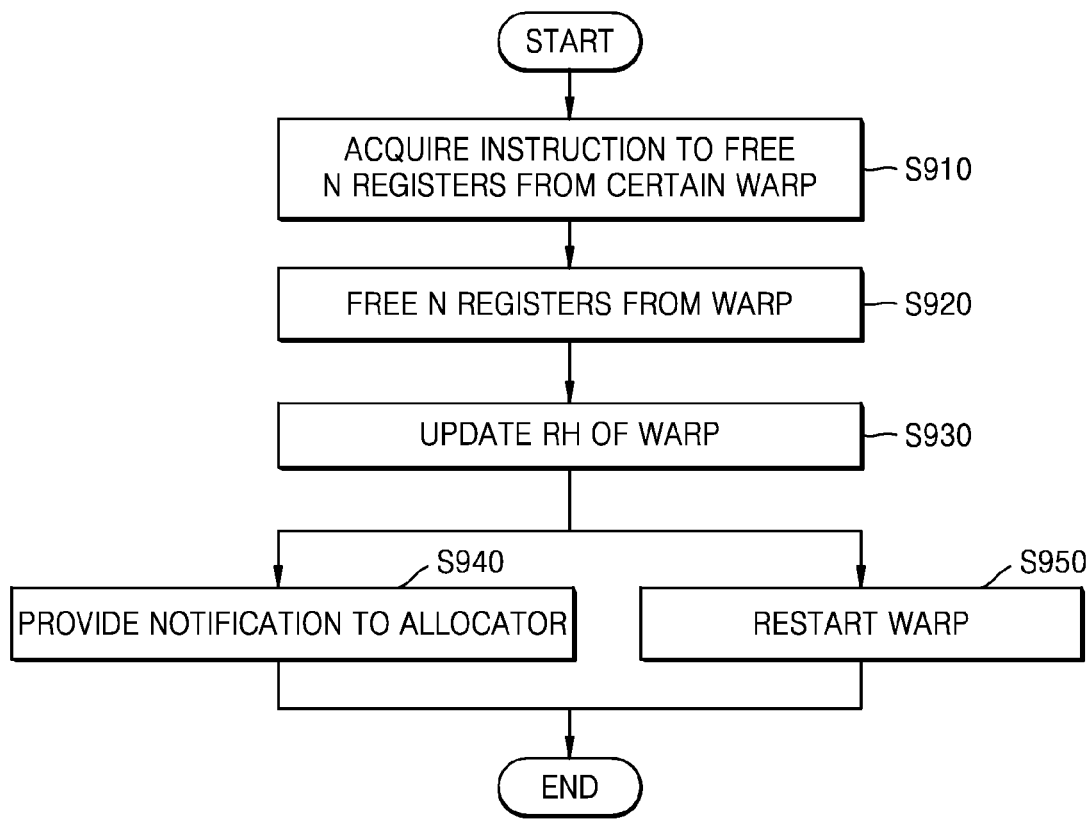
FIG. 9 is a flowchart illustrating a method in which the device for register management according to an embodiment processes data according to a register allocation instruction.

FIG. 9 is a flowchart illustrating a method in which the device 300 for register management according to an embodiment that processes data according to a register allocation instruction.

In operation S910, the method acquires an instruction to free N registers from a certain warp. For example, device 300 for register management according to such an embodiment acquires an instruction to free N registers from a certain warp.

For example, the device 300 for register management according to such an embodiment acquires an instruction to free two registers from a third warp from among a plurality of warps managed by the device 300 for register management.

In operation S920, the method frees N registers from the warp. For example, the device 300 for register management according to such an embodiment frees N registers from the warp.

For example, the device 300 for register management according to such an embodiment frees N registers without a specific determination of whether or not it is possible to free N registers from the warp.

The device 300 for register management according to such an embodiment frees N registers from the certain warp from among the plurality of warps managed by the device 300 for register management. For example, the device 300 for register management according to such an embodiment frees two registers from the third warp form among the plurality of warps managed by the device 300 for register management. In this example, two registers are freed from each thread of a plurality of threads included in the third warp. Alternatively, in this example, two registers are freed from a certain thread from among the plurality of threads included in the third warp.

In operation 930, the method updates an RH of the warp. For example, the device 300 for register management according to such an embodiment updates an RH of the warp.

When N registers are freed from the warp determined in operation S910, the device 300 for register management according to such an embodiment updates an RH including information on data usage status resulting from register freeing. For example, the device 300 for register management according to such an embodiment provides register usage status that is changed by the register freeing performed in operation S920 to the RH.

When N registers are freed from the warp determined in operation S910, the device 300 for register management according to such an embodiment updates an ROT including information on data usage status resulting from register freeing. For example, the device 300 for register management according to such an embodiment provides register usage status that is changed by the register freeing performed in operation S920 to the ROT.

In operation S940, the method notifies an allocator of updated information. For example, the device 300 for register management according to such an embodiment notifies an allocator of updated information.

For example, the allocator is located in the device 300 for register management, the RH, or the ROT.

In operation S950, the method restarts the warp. For example, the device 300 for register management according to such an embodiment restarts the warp.

For example, the device 300 for register management according to such an embodiment restarts the warp by using the number of registers changed by the register freeing performed in operation S920.

Figure 10A:
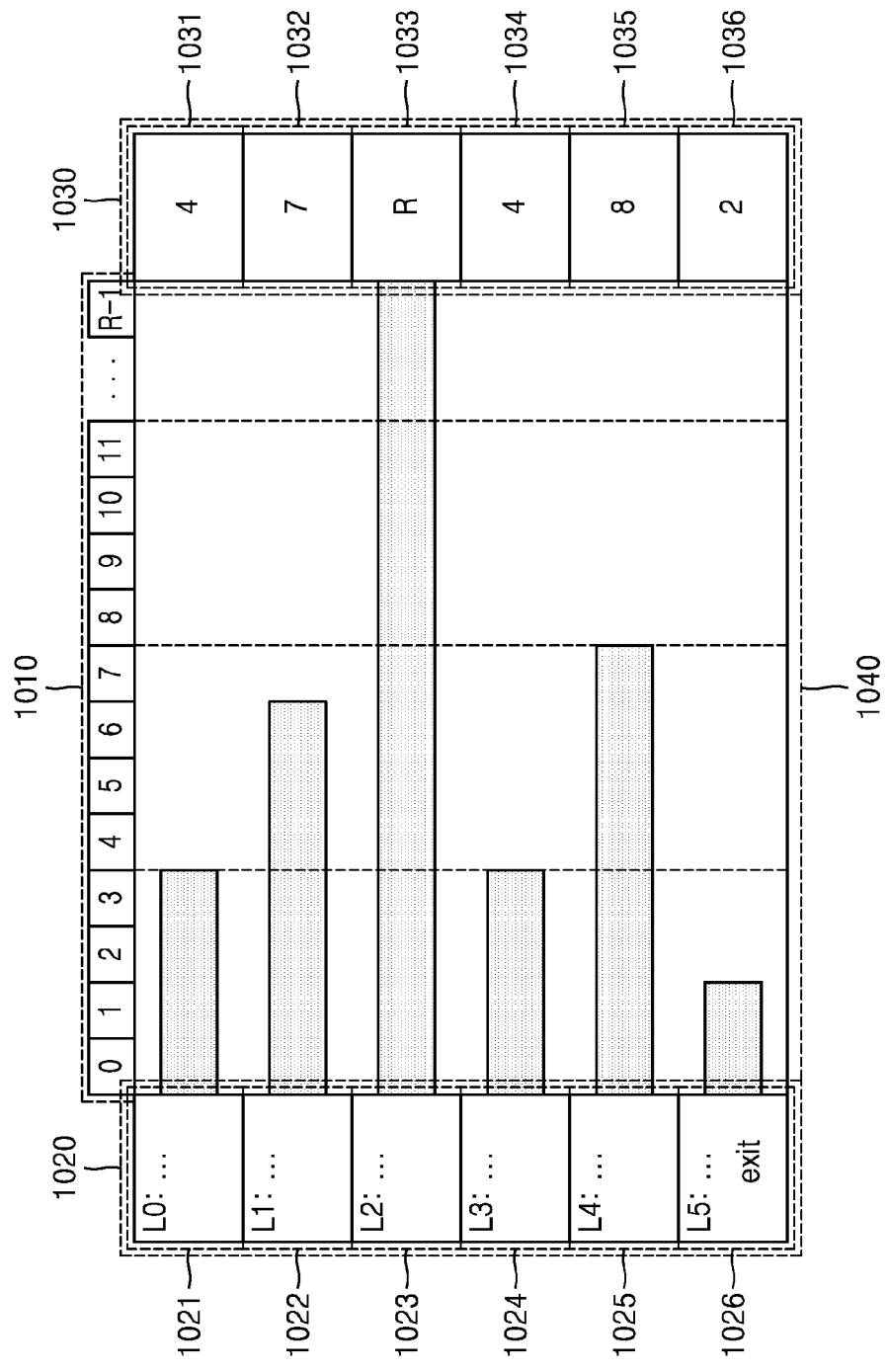
FIG. 10A is a diagram illustrating a method in which the device for register management according to an embodiment processes data according to the number of registers allocated to each code block included in a thread.

FIG. 10A is a diagram illustrating a method in which the device 300 for register management according to an embodiment for processing data according to the number of registers allocated to each code block included in a thread.

In the example of FIG. 10A, a code block 1020 represents a set of consecutive instructions for performing one or more operations and/or a memory region in which the consecutive instructions are stored. For example, a code block is be a set of one or more instructions satisfying the condition of having an SESE structure or an SEME structure, or a memory region in which the one or more instructions satisfying the condition of having an SESE structure or an SEME structure are stored.

A method of executing instructions included in six code blocks 1021 to 1026 according to an embodiment is described further with reference to FIG. 10A.

According to an embodiment, four registers 1031 are necessary for a first code block 1021, seven registers 1032 are necessary for a second code block 1022, R registers 1033 are necessary for a third code block 1023, four registers 1034 are necessary for a fourth code block 1024, eight registers 1035 are necessary for a fifth code block 1025, and two registers 1036 are necessary for a sixth code block 1026. The number of registers necessary for each code block is shown in a region 1030 on the right side. Note that R, as discussed earlier, is a maximum number of registers.

It is possible to see how many registers are necessary for each code block based on a histogram 1040 that shows register requirements using horizontal-axis values 1010.

According to an embodiment, the first code block 1021 is able to be executed as long as four registers are allocated. Therefore, the device 300 for register management executes an instruction to request four registers for the first code block 1021. When execution of the second code block 1022 is attempted according to an embodiment, three more registers are necessary than those for executing the first code block 1021, because the second code block 1022 requires at least seven registers. Therefore, when the execution of the second code block 1022 is attempted, the device 300 for register management executes an instruction to request the additional allocation of three registers. The device 300 for register management according to such an embodiment requests additional allocation of R-7 registers when executing the third code block 1023, requests freeing of R-4 registers when executing the fourth code block 1024, requests additional allocation of four registers when executing the fifth code block 1025, and requests freeing of six registers when executing the sixth code block 1026. Also, when execution of the sixth code block 1026 is finished, execution of the warp is also finished. Thus, the device 300 for register management according to such an embodiment frees all remaining occupied registers.

The device 300 for register management according to an embodiment determines a minimum register unit value of one or more for register allocation and freeing. According to an embodiment, when the minimum register unit is one, it is possible to reduce unnecessary register allocation, but a size of an ROT possibly increases. According to an embodiment, when the minimum register unit is larger than one, unnecessary register allocation may occur, but a size of an ROT may become smaller. For example, when the smallest register unit is four, eight registers may be allocated to the second code block 1022, because eight registers is the smallest set of registers that is greater than or equal to seven where the registers are allocated in groups of four.

Figure 10B:
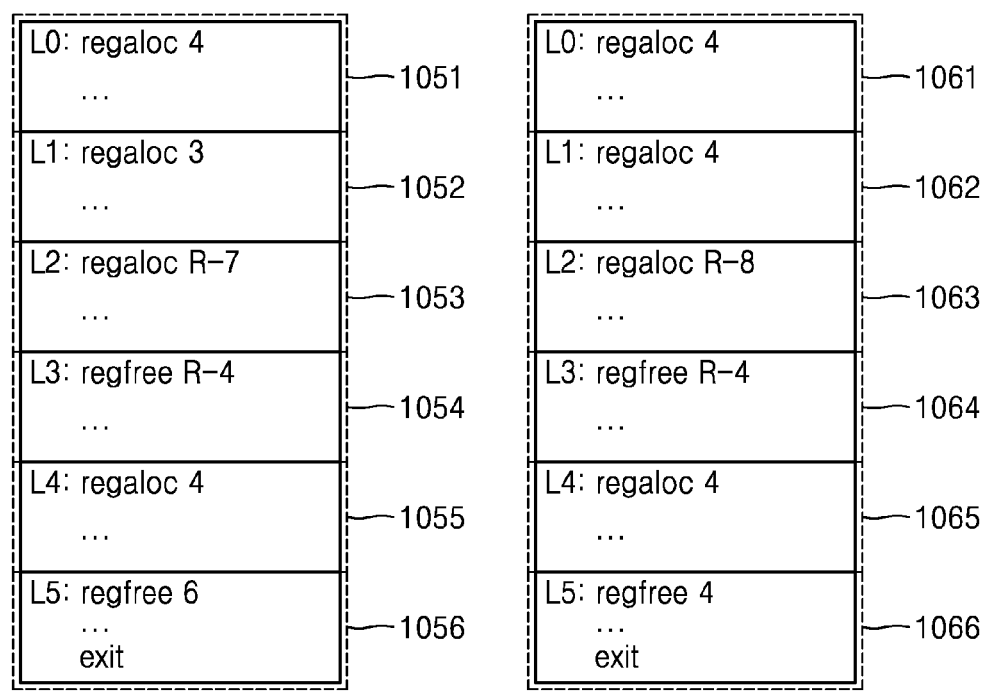
FIG. 10B is a diagram illustrating an instruction for the device for register management according to an embodiment to process data according to the number of registers allocated to each code block included in a thread.

FIG. 10B is a diagram illustrating an instruction for the device 300 for register management according to an embodiment to process data according to the number of registers allocated to each code block included in a thread.

The left side of the example of FIG. 10B shows an example when the minimum unit of the number of allocable registers is 1.

The device 300 for register management according to such an embodiment requests allocation of four registers when executing the first code block 1021, requests an additional allocation of three registers when executing the second code block 1022, requests an additional allocation of R-7 registers when executing the third code block 1023, requests a freeing of R-4 registers when executing the fourth code block 1024, requests an additional allocation of four registers when executing the fifth code block 1025, and requests a freeing of six registers when executing the sixth code block 1026. Also, when execution of the sixth code block 1026 is finished, execution of the warp is finished, and thus the device 300 for register management according to such an embodiment frees all remaining occupied registers.

The right side of FIG. 10B shows an example when the minimum unit of the number of allocable registers is 4.

The device 300 for register management according to such an embodiment requests an allocation of four registers when executing the first code block 1021, requests an additional allocation of four registers when executing the second code block 1022, requests an additional allocation of R-8 registers when executing the third code block 1023, requests a freeing of R-4 registers when executing the fourth code block 1024, requests an additional allocation of four registers when executing the fifth code block 1025, and requests a freeing of four registers when executing the sixth code block 1026. Also, when an execution of the sixth code block 1026 is finished, execution of the warp is finished, and thus the device 300 for register management according to such an embodiment frees all occupied registers.

Figure 11A:
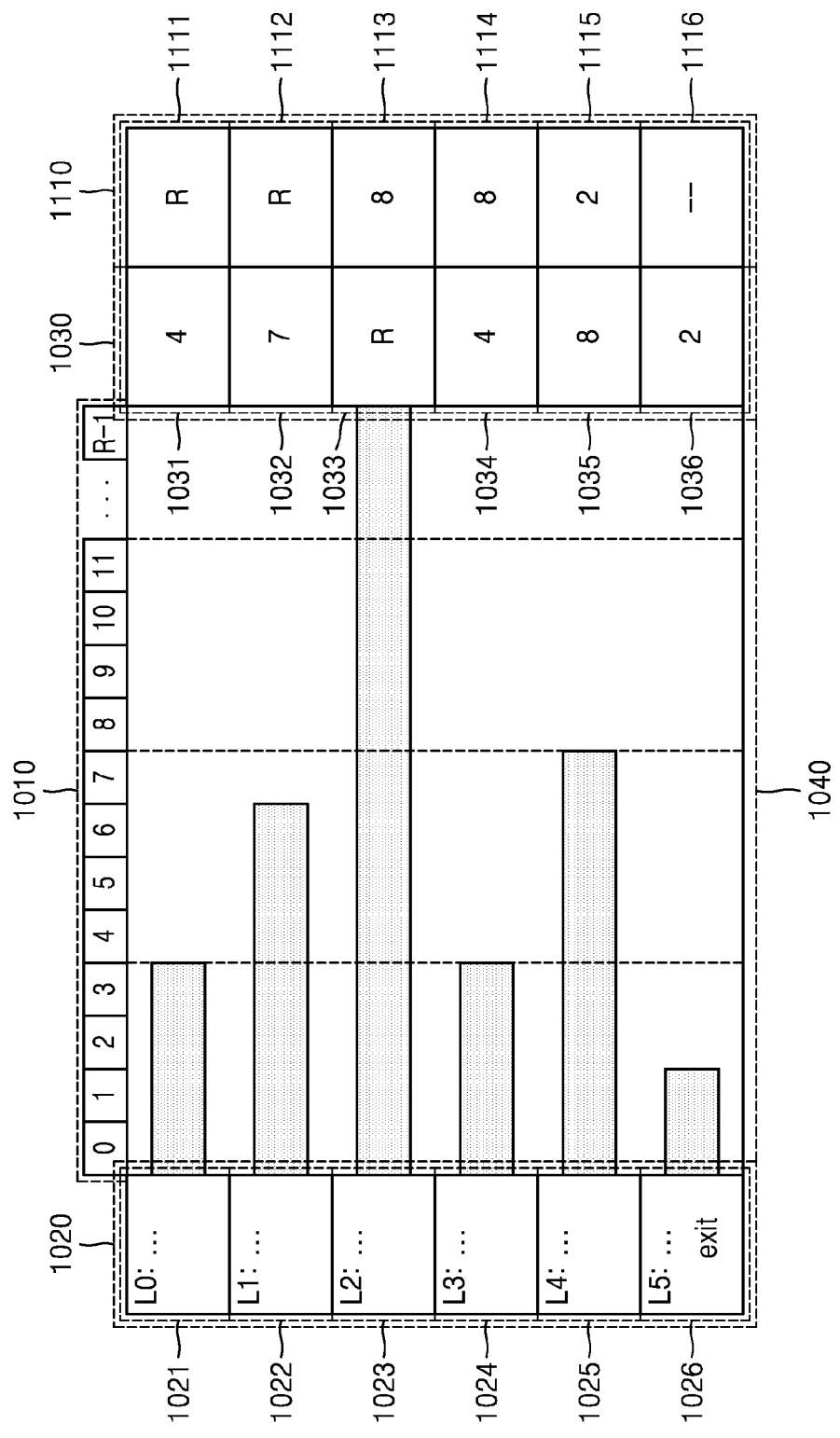
FIG. 11A is a diagram illustrating a method in which the device for register management according to an embodiment processes data according to the number of registers allocated to each code block included in a thread.

FIG. 11A is a diagram illustrating a method in which the device 300 for register management according to an embodiment processes data according to the number of registers allocated to each code block included in a thread.

For example, a maximum number of registers according to an embodiment represents a largest number among numbers of registers for executing respective code blocks executed after a currently executed code block from among a plurality of code blocks included in a thread.

The device 300 for register management according to such an embodiment acquires information indicating the maximum number of registers representing the largest number among numbers of registers for executing respective code blocks executed after a currently executed code block from among a plurality of code blocks included in a thread. The information indicating the maximum number of registers is shown in a region 1110 on the right side of FIG. 11A.

According to such an embodiment, a code block demanding the maximum number of registers from among code blocks executed after the first code block 1021 is the third code block 1023, and the number of registers used for the third code block 1023 is R. Therefore, a maximum number 1111 of registers corresponding to the first code block 1021 is R, and is acquired by the device 300 for register management and is stored in an ROT.

According to such an embodiment, a code block demanding the maximum number of registers from among code blocks executed after the second code block 1022 is the third code block 1023, and the number of registers for the third code block 1023 is R. Therefore, a maximum number 1112 of registers corresponding to the second code block 1022 is R, and the maximum number 1112 of registers corresponding to the second code block 1022 is acquired by the device 300 for register management and stored in the ROT.

According to such an embodiment, a code block demanding the maximum number of registers from among code blocks executed after the third code block 1023 is the fifth code block 1025, and the number of registers for the fifth code block 1025 is 8. Therefore, a maximum number 1113 of registers corresponding to the third code block 1023 is 8, and is acquired by the device 300 for register management and stored in the ROT.

According to an embodiment, a code block demanding the maximum number of registers from among code blocks executed after the fourth code block 1024 is the fifth code block 1025, and the number of registers for the fifth code block 1025 is 8. Therefore, a maximum number 1114 of registers corresponding to the fourth code block 1024 is 8, and is acquired by the device 300 for register management and stored in the ROT.

According to an embodiment, a code block demanding the maximum number of registers from among code blocks executed after the fifth code block 1025 is the sixth code block 1026, and the number of registers for the sixth code block 1026 is 2. Therefore, a maximum number 1115 of registers corresponding to the fifth code block 1025 is two, and is acquired by the device 300 for register management and stored in the ROT.

According to an embodiment, there is no code block executed after the sixth code block 1026. Therefore, information indicating that there is no maximum number of registers corresponding to the sixth code block 1026 and there is not a maximum number 1116 of registers corresponding to the sixth code block 1026 is acquired by the device 300 for register management and stored in the ROT.

Figure 11B:
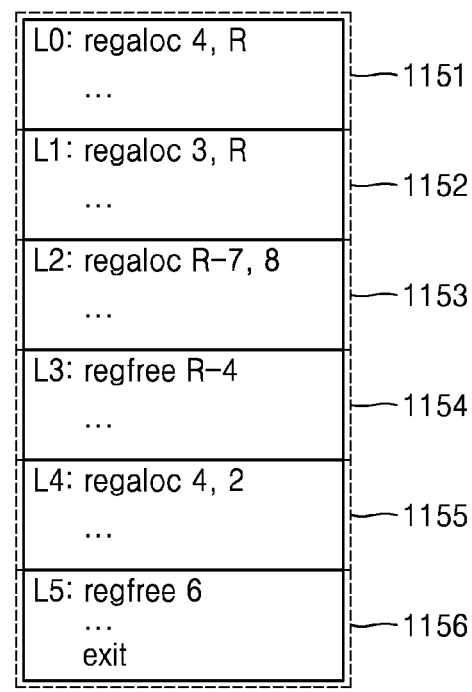
FIG. 11B is a diagram illustrating an instruction for the device for register management according to an embodiment to process data according to the number of registers allocated to each code block included in a thread.

FIG. 11B is a diagram illustrating an instruction for the device 300 for register management according to an embodiment for processing data according to the number of registers allocated to each code block included in a thread.

The device 300 for register management according to such an embodiment requests allocation of four registers and also records information indicating that a maximum number of registers necessary after the first code block 1021 is R when executing the first code block 1021. The device 300 also requests additional allocation of four registers and also records information indicating that a maximum number of registers necessary after the second code block 1022 is R when executing the second code block 1022, requests additional allocation of R-8 registers and also records information indicating that a maximum number of registers necessary after the third code block 1023 is 8 when executing the third code block 1023, requests freeing of R-4 registers and also records information indicating that a maximum number of registers necessary after the fourth code block 1024 is 8 when executing the fourth code block 1024, such that recording of the maximum number of registers is optionally omitted according to such an embodiment when the maximum number of registers is identical to the previous maximum number of registers, requests additional allocation of four registers and also record information indicating that a maximum number of registers necessary after the fifth code block 1025 is 2 when executing the fifth code block 1025, and requests freeing of four registers when executing the sixth code block 1026. Also, when execution of the sixth code block 1026 is finished, execution of the warp is also finished, and thus the device 300 for register management according to such an embodiment frees all occupied registers.

A deadlock according to an embodiment represents a phenomenon where data processing flow is delayed. Such a delay is potentially due to one aspect of execution being forced to wait for resources that it requires to be released by another aspect of execution. For example, a deadlock represents a state in which a plurality of warps have requested additional registers but are waiting because the number of idle registers is not sufficient.

For example, the device 300 for register management according to an embodiment avoids a deadlock by using and managing information on a maximum number of registers. The device 300 for register management according to such an embodiment acquires information on a maximum number of registers to be used in the future, and adjusts a register allocation point in time by using the acquired information on the maximum number of registers, thereby avoiding a deadlock. For example, the device 300 for register management according to such an embodiment estimates whether or not a situation in which all of a plurality of warps or threads are not allocated registers will potentially occur in the future by using information on the number of registers which currently remain idle in a register allocation and register freeing process, and the number of registers to be freed thereafter from the corresponding warp.

Therefore, the device 300 for register management according to such an embodiment avoids a deadlock by using the information on a maximum number of registers.

The apparatuses, units, modules, devices, and other components illustrated in FIGS. 1-11B that perform the operations described herein with respect to FIGS. 1-11B are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-11B. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11B that perform the operations described herein with respect to FIGS. 1-11B are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing data, the method comprising:
   executing a first code block, comprising one or more execution codes, using a first number of registers allocated to the first code block;
   acquiring a second number, wherein the second number is a number of registers for executing a second code block, comprising one or more execution codes, executed after the first code block, and allocating a number of registers used for executing the first code block to the second code block based on a difference between the first number and the second number; and
   executing the second code block using at least the registers used for executing the first code block that were allocated to the second code block,
   wherein the allocating of the number of the registers used for executing the first code block to the second code block comprises:
   updating a register occupancy table (ROT), wherein the ROT comprises information related to a number of registers corresponding to each of the first code block and the second code block; and
   updating a register hash (RH), wherein the RH comprises information related to a number of registers corresponding to the second code block,
   wherein,
   each of the first code block, the second code block and at least one third code block is included in one thread of threads managed by a warp, wherein a warp is an independent data processor,
   the ROT comprises information related to a maximum number of registers, which is a greatest number among numbers of registers for executing respective code blocks of the second code block and the at least one third code block of the one thread to be executed after the first code block, wherein at least one code block among the second code block and the at least one third code block is allocated the maximum number of registers and at least one other code block among the second code block and the at least one third code block is allocated less than the maximum number of registers, and
   the method further comprises using the information related to the maximum number of registers to adjust a register allocation point in time.

2. The method of claim 1, wherein each thread managed by the warp includes code blocks, and wherein the ROT comprises information related to a number of registers corresponding to each of the code blocks included in the threads.

3. The method of claim 1, wherein in response to the first number being smaller than the second number, all the registers used for executing the first code block are allocated to the second code block, and in response to the first number being larger than the second number, some of the registers used for executing the first code block, equaling the second number of registers, all allocated to the second code block, and a freeing operation is performed to free all remaining ones of the registers used for executing the first code block.

4. The method of claim 1, wherein the one or more execution codes of the first code block and the second code block each comprise a set of consecutive instructions for performing one or more operations.

5. The method of claim 4, wherein the consecutive instructions of at least one of the first code block and the second code block satisfy a single-entry single-exit (SESE) condition.

6. The method of claim 1, wherein a total number of registers corresponding to the second code block is determined based on a preset minimum register unit of two or more registers.

7. A device for processing data, the device comprising:
a receiver configured to receive code blocks comprising one or more execution codes; and
a controller configured to execute a first code block received from the receiver using a first number of registers allocated to the first code block, acquire a second number, wherein the second number is a number of registers for executing a second code executed after the first code block and received from the receiver, allocate a number of registers used for executing the first code block to the second code block based on a difference between the first number and the second number, and execute the second code block using at least the registers used for executing the first code block that were allocated to the second code block,
wherein the controller updates a register occupancy table (ROT), the ROT comprising information related to a number of registers corresponding to each of the first and second code blocks,
wherein the controller updates a register hash (RH), the RH comprising information related to a total number of registers corresponding to the second code block,
wherein,
each of the first code block, the second code block and at least one third code block is included in one thread of threads managed by a warp, wherein a warp is an independent data processor,
the ROT comprises information related to a maximum number of registers, which is greatest number among numbers of registers for executing respective code blocks of the second code block and the at least one third code block of the one thread to be executed after the first code block, wherein at least one code block among the second code block and the at least one third code block is allocated the maximum number of registers and at least one other code block among the second code block and the at least one third code block is allocated less than the maximum number of registers, and
the controller further uses the information related to the maximum number of registers to adjust a register allocation point in time.

8. The device of claim 7, wherein each thread managed by the warp includes code blocks, and wherein the ROT comprises information related to a number of registers corresponding to each of the code blocks included in the threads.

9. The device of claim 7, wherein in response to the first number being smaller than the second number, all the registers used for executing the first code are allocated by the controller to the second code block, and in response to the first number being larger than the second number, some of the registers used for executing the first code block, equaling the second number of registers, are allocated by the controller to the second code block, and a freeing operations is performed by the controller to free all remaining ones of the registers used for executing the first code block.

10. The device of claim 7, wherein the one or more execution codes of the first code block and the second code block each comprises a set of consecutive instructions for performing one or more operations.

11. The device of claim 10, wherein the consecutive instructions of at least one code block satisfy a single-entry single-exit (SESE) condition.

12. A non-transitory computer-readable storage medium storing instructions for causing computing hardware to perform a method of processing data, wherein the method comprises:
executing a first code block, comprising one or more execution codes, using a first number of registers allocated to the first code block;
acquiring a second number, wherein the second number is a number of registers for executing a second code block, comprising one or more execution codes, executed after the first code block, and allocating a number of the registers used for executing the first code block to the second code block based on a difference between the first number and the second number; and
executing the second code block using the registers allocated to the second code block,
wherein the allocating of the number of the registers used for executing the first code block to the second code block comprises:
updating a register occupancy table (ROT), wherein the ROT comprises information related to a number of registers corresponding to each of the first code block and the second code block; and
updating a register hash (RH), wherein the RH comprises information related to information on a number of registers corresponding to the second code block,
wherein,
each of the first code block, the second code bloack and at least one third code block is included in one thread of threads managed by a warp, wherein in a warp is an independent data processor,
the ROT comprises information related to a maximum number of registers, which is as greatest number among numbers of registers for executing respective code blocks of the second code block and the at least one third code block of the one thread to be executed after the first code block, wherein at least one code block among the second code block and the at least one third code block is allocated the maximum number of registers and at least one other code block among the second code block and the at least one third code block is allocated less than the maximum number of registers, and
the method further comprises using the information related to the maximum number of registers to adjust a register allocation point in time.

* * * * *